United States Patent
Sun (10) Patent No.: US 7,453,440 B2
(45) Date of Patent: Nov. 18, 2008

(54) PORTABLE ELECTRONIC DEVICE WITH IMPROVED AUDIO AND VIDEO EFFECTS

(75) Inventor: Zheng-Heng Sun, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 63 days.

(21) Appl. No.: 11/615,940

(22) Filed: Dec. 23, 2006

(65) Prior Publication Data

US 2007/0279857 A1 Dec. 6, 2007

(30) Foreign Application Priority Data

Jun. 2, 2006 (CN) .......................... 2006 1 0060948

(51) Int. Cl.
*G06F 3/02* (2006.01)
*G06F 1/16* (2006.01)
(52) U.S. Cl. ...................... 345/168; 345/169; 345/156; 361/683
(58) Field of Classification Search .............. 361/681, 361/683; 312/223.1, 223.2; 345/156, 168–172, 345/905; 348/794; 455/575.3, 575.1, 90.1–90.3, 455/351; 248/917–924
See application file for complete search history.

(56) References Cited

U.S. PATENT DOCUMENTS

| | | | |
|---|---|---|---|
| 5,825,614 A * | 10/1998 | Kim .......................... 361/683 |
| 6,073,187 A * | 6/2000 | Jacobs et al. .................. 710/14 |
| 6,243,260 B1 | 6/2001 | Lundgren et al. |
| 6,392,871 B1 | 5/2002 | Yanase |
| 6,657,854 B2 * | 12/2003 | Horii et al. .................. 361/683 |
| 6,744,623 B2 * | 6/2004 | Numano et al. ............. 361/681 |
| 6,792,480 B2 * | 9/2004 | Chaiken et al. ............... 710/14 |
| 7,035,665 B2 * | 4/2006 | Kido et al. .................. 455/566 |
| 2002/0159227 A1 * | 10/2002 | Sasaki et al. ................ 361/681 |
| 2006/0050473 A1 * | 3/2006 | Zheng ........................ 361/681 |

* cited by examiner

*Primary Examiner*—Lisa Lea-Edmonds
*Assistant Examiner*—Nidhi Desai
(74) *Attorney, Agent, or Firm*—Wei Te Chung (57) ABSTRACT

An exemplary portable electronic device comprises a base unit, a display unit with a display unit, a hinge mechanism for pivotably attaching the display unit to the base unit, and a console assembly including a controller and a speaker. An extension portion extends from a rear end of the base unit. Two support portions extend from a lower portion of the display unit, and the display unit defines a holding space between the two support portions to receive the extension portion of the base unit. The hinge mechanism includes two fixing members attached on the extension portion, and two pivoting members respectively secured to the two support portions and pivotably mounted to the two fixing members. The display unit is pivotable between a first position where the display screen is toward the base unit and a second position where the display screen is away the base unit. The controller is rotatably mounted on the extension portion and is rotatable to cause sound output of the speaker being oriented with the same direction as the display screen at the first and second positions.

20 Claims, 8 Drawing Sheets

PORTABLE ELECTRONIC DEVICE WITH IMPROVED AUDIO AND VIDEO EFFECTS

BACKGROUND OF THE INVENTION

1. Field of the Invention

The present invention relates to portable electronic devices, and more particularly to a portable personal computer with high-quality audio and video effects.

2. Description of Prior Art

Because of the integration of more and more functional modules, such as speakers and disk drives, into portable computer systems, portable computer systems have become multi-media systems and have been more used for entertainment. Furthermore, with the increasing availability, lower cost, portable multi-media computer systems, the need for better audio and video effects in such systems has become increasingly important.

In general, sound output quality of speakers used within traditional portable computers is generally inferior. Of course, one reason for the poor sound quality is the relatively small speaker sizes. Small speaker size makes it difficult to produce quality sound over a wide frequency range, and particularly at lower frequencies. However, another key factor in sound output quality is the inability of a computer user to conveniently direct the sound output by adjustment of the speakers' orientation toward the user.

In addition, a disk drive is also added-on to complete a multi-media system. For watching movies, a disk media such as a DVD disk having video data stored therein is inserted into a disk drive such as a DVD drive within a portable multi-media computer system. However, when a display portion is unfolded at an angle relative to a base portion of a conventional portable computer, the base portion remains in the user's field of view, adversely affecting the user's movie experience.

What is desired, therefore, is a portable personal computer with high-quality audio and/or video effects.

SUMMARY OF THE INVENTION

In one preferred embodiment, a portable electronic device comprises a base unit, a display unit, a hinge mechanism for pivotably attaching the display unit to the base unit, and a console assembly including a controller. An extension portion extends from a rear end of the base unit. Two support portions extend from a lower portion of the display unit, and the display unit defines a holding space between the two support portions to receive the extension portion of the base unit. The hinge mechanism includes two fixing members attached on the extension portion, and two pivoting members respectively secured to the two support portions and pivotally mounted to the two fixing members. The controller is rotatably mounted on the extension portion and receivable in the holding space of the display unit.

Other advantages and novel features will become more apparent from the following detailed description of a preferred embodiment when taken in conjunction with the accompanying drawings, in which:

DETAILED DESCRIPTION OF THE INVENTION

Figure 1:
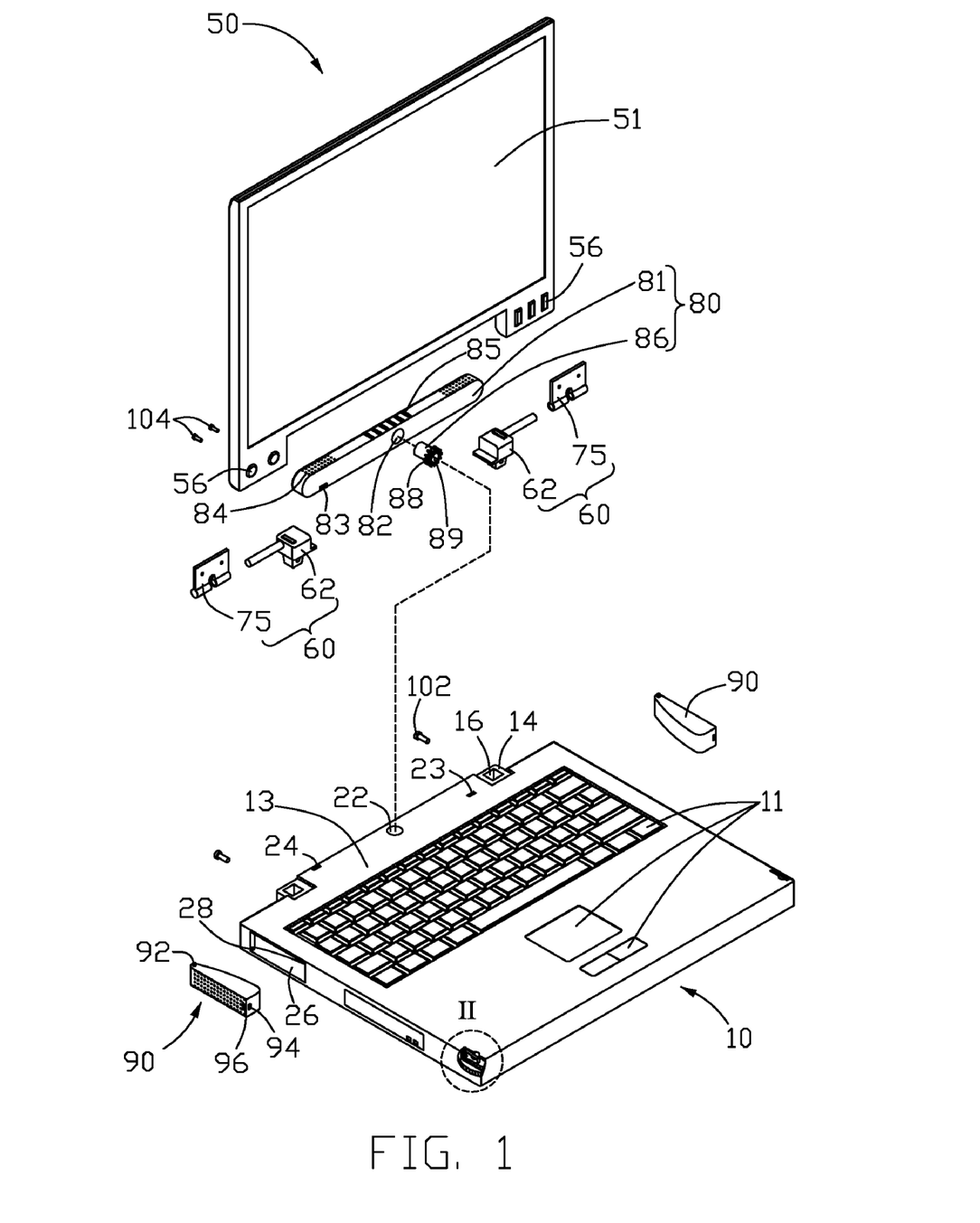
FIG. 1 is an exploded perspective view of a portable personal computer in accordance with a preferred embodiment of the present invention, including a base unit, a display unit, a hinge mechanism, a multi-media controller, and two first speakers.

Referring to FIG. 1, in a preferred embodiment of the invention, a portable personal computer is provided for illustrating the spirit of the invention. The portable computer includes a base unit 10 with input devices 11 installed in a top surface 13 thereof for input of commands to the computer, a display unit 50 with a display screen 51, and a hinge mechanism 60 configured for pivotably attaching the display unit 50 to the base unit 10, a console assembly 80, and two first speakers 90.

Figure 2:
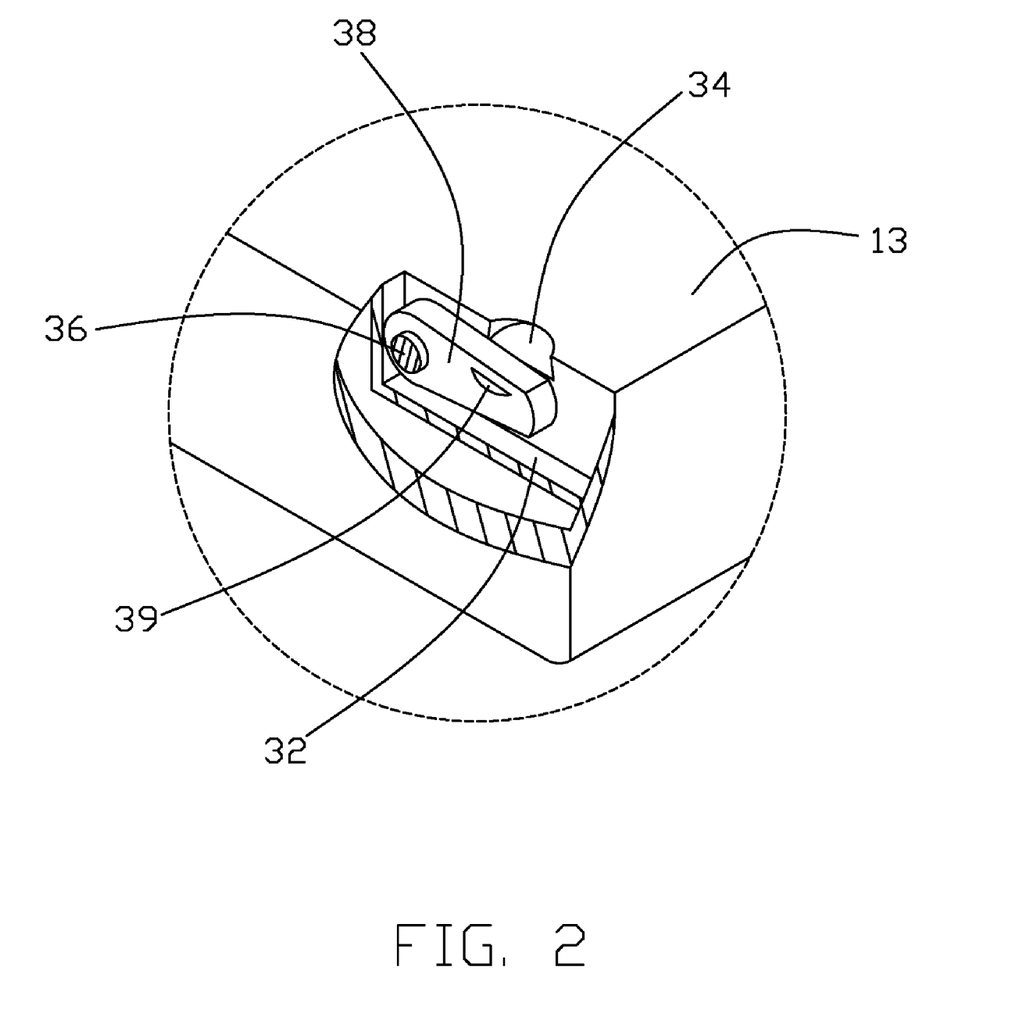
FIG. 2 is an enlarged view of an encircled portion 11 of FIG. 1.
Figure 3:
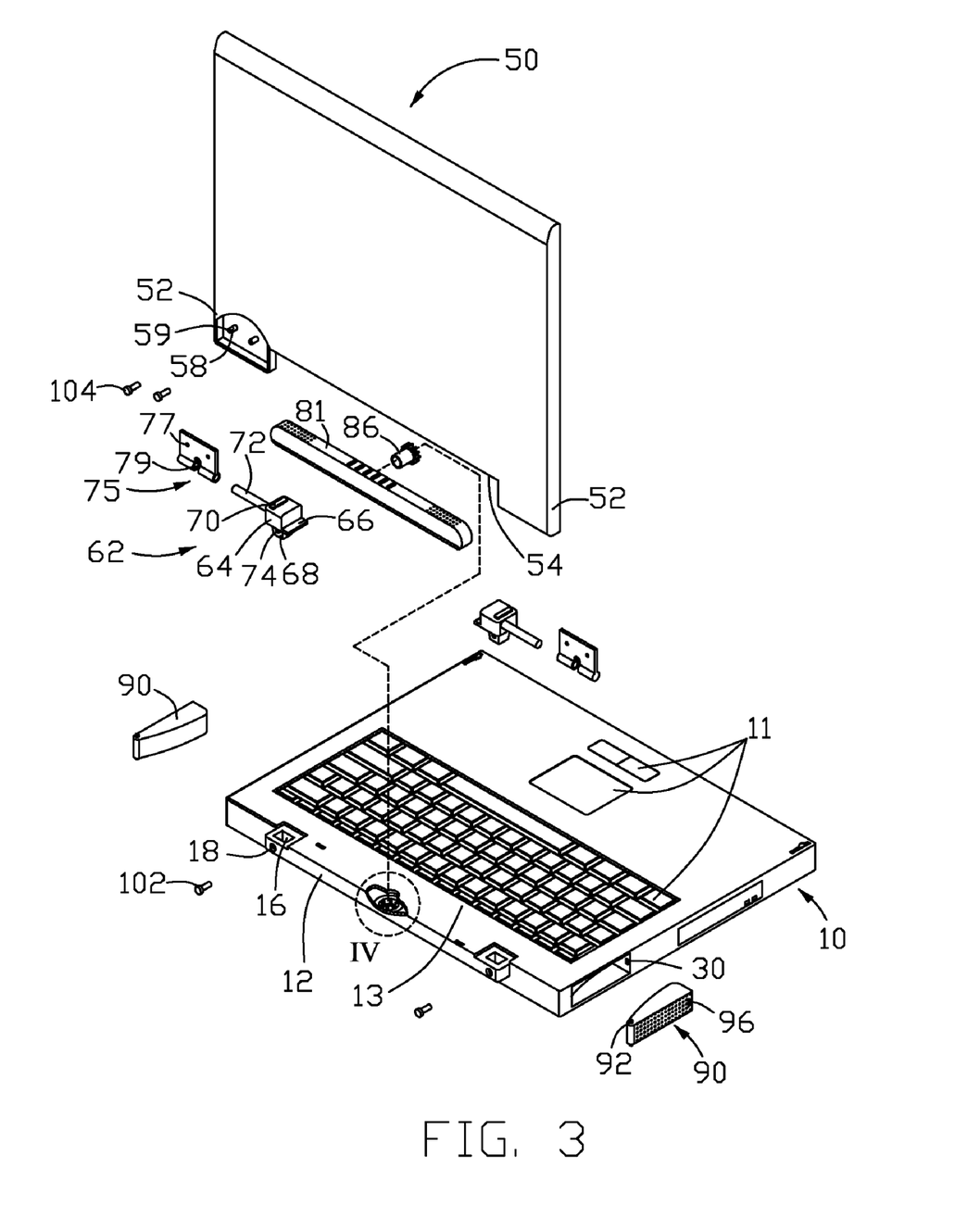
FIG. 3 is similar to FIG. 1, but viewed from another aspect.
Figure 4:
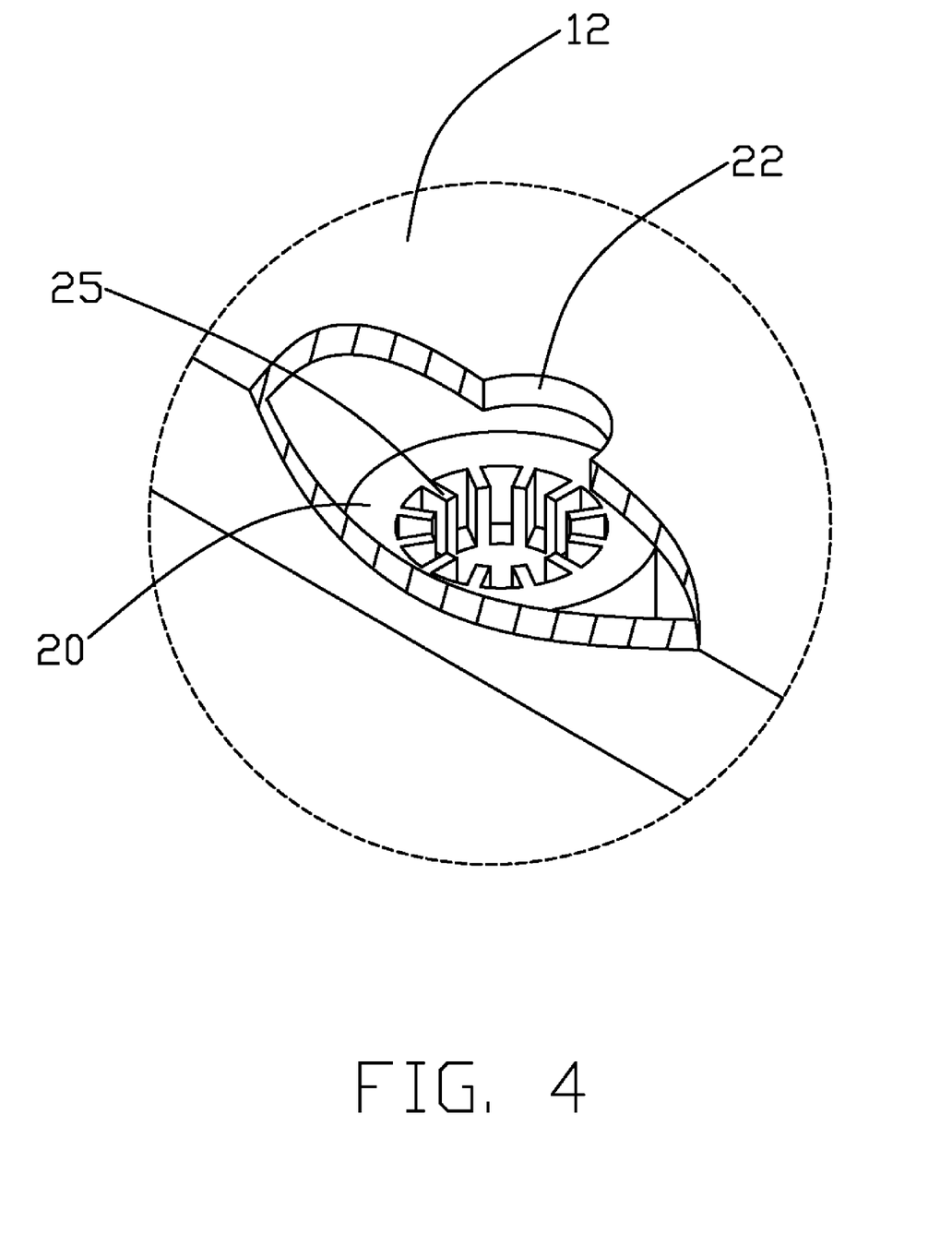
FIG. 4 is an enlarged view of an encircled portion IV of FIG. 3.

Referring also to FIGS. 2 to 4, the base unit 10 has a motherboard, disk drives, memory cards, and relevant devices housed therein. An extension portion 12 extends out from a middle portion of a rear end of the base unit 10. Two depressed portions 14 are formed in the top surface 13 of the base unit 10 generally at two ends of the extension portion 12 respectively, and each depressed portion 14 further defines a vertical chamber 16 therein. Two horizontal fixing holes 18 are respectively defined in two ends of a back surface of the extension portion 12 and respectively communicate with the corresponding chambers 16. A holder 20 is secured within the base unit 10 adjacent to a middle section of the extension portion 12. The holder 20 is hollow along an axis thereof, and a plurality of first spaced teeth 25 encircle or bound the hollow axis. A passage 22 is defined in the top surface 13 of the base unit 10 corresponding to the holder 20. Two positioning grooves 23, 24 are defined in the top surface 13 of the base unit 10 respectively adjacent to the two depressed portions 14. Two recesses 26 are respectively defined in right and left two sides of the base unit 10 adjacent to the rear end of the base unit 10. Two installing apertures 28 are respectively defined in top and bottom sections of the base unit 10 bounding each recess 26 and in communication with a back end of each recess 26. A securing cavity 30 is defined in a front section of the base unit 10 bounding each recess 26 and in communication with a front end of each recess 26. Two retaining slots 32 are defined in a front section of the top surface 13 of the base unit 10. Two finger gaps 34 are defined in the top surface 13 of the base unit 10 respectively in communication with opposite sides of the retaining slots 32 to facilitate entry of fingers. In each retaining slot 32 a horizontal shaft 36 extends from the top surface 13 of the base unit 10. A supporter 38 is pivotably secured to each shaft 36 and can be received in or taken out of the corresponding retaining slot 32. When the two supporters 38 are respectively secured to the corresponding retaining slots 32, the two supporters 38 interferentially fit with the two corresponding shafts 36 for retaining the supporters 38 within the retaining slots 32, respectively. Two orifices 39 are respectively defined in two sides of each supporter 38 facilitating grasping the supporter 38 to take it out from the corresponding retaining slot 32.

Two support portions 52 respectively extend from two sides of a lower portion of the display unit 50, thereby defining a holding space 54 between the two support portions 52 to receive the extension portion 12 of the base unit 10. A plurality of functional buttons 56 of the display unit 50, such as push buttons used for controlling power on/off, adjusting brightness and contrast, and so on, is set in front surfaces of the two support portions 52. A plurality of posts 58 each defining a connecting hole such as a threaded hole 59 projects from back surfaces of the two support portions 52.

The hinge mechanism 60 includes two fixing members 62 and two pivoting members 75 respectively pivotably mounted to the two fixing members 62. Each fixing member 62 includes a body portion 64, an engaging portion 66 formed at a bottom of the body portion 64 for engaging in a corresponding depressed portion 14 of the base unit 10, and a securing portion 68 projecting from a bottom of the engaging portion 66 for being received in the corresponding chamber 16 in the corresponding depressed portion 14. A bolster 70 is formed on a top of the body portion 64. An elongated rod 72 extends from a side of the body portion 64. An engaging hole such as a threaded hole 74 is defined in the securing portion 68, corresponding to a corresponding fixing hole 18 of the extension portion 12. Each pivoting member 75 defines a plurality of holding holes 77 corresponding to the threaded holes 59 of a corresponding support portion 52 of the display unit 50. An edge of the pivoting member 75 bends to shape a hollow pivoting portion 79 to receive the elongated rod 72 of the fixing member 62. When the two pivoting members 75 are pivotably mounted to the two fixing members 62, respectively, the pivoting rod 72 of each fixing member 62 interferentially fits with the pivoting portion 79 of a corresponding pivoting member 75.

The console assembly 80 includes a multi-media controller 81 configured for controlling reproduction of movies and music, and a coupling member 86 secured to the controller 81. A coupling opening 82 is defined in a bottom of the controller 81 to hold the coupling member 86, and a positioning tab 83 protrudes from the bottom of the controller 81 corresponding to the two positioning grooves 23, 24 of the base unit 10. Two second speakers 84 are respectively located in two ends of a front surface of the controller 81. A plurality of buttons 85 used for controlling reproduction of movies and music is arrayed between the two ends of the front surface of the controller 81. The coupling member 86 has a through channel 89 defined therein to allow signal wires extending therethrough, and is formed with a plurality of second spaced teeth 88 encircling an outer circumference of one end thereof for engaging with the first teeth 25 of the holder 20.

The two first speakers 90 are pivotably secured within the two recesses 26 of the base unit 10, respectively. Two pins 92 protrude respectively from upper and lower surfaces of each first speaker 90 adjacent to an end thereof, corresponding to the installing apertures 28 of the base unit 10. A locking portion 94 projects from the other end of each first speaker 90, corresponding to the securing cavity 30 of the base unit 10. An operating notch 96 is defined in a front surface of each first speaker 90. When the two first speakers 90 are respectively secured within the corresponding recesses 26 of the base unit 10, the two pins 92 of each first speaker 90 interferentially fit with the two installing apertures 28 of the corresponding recess 26, respectively.

Figure 5:
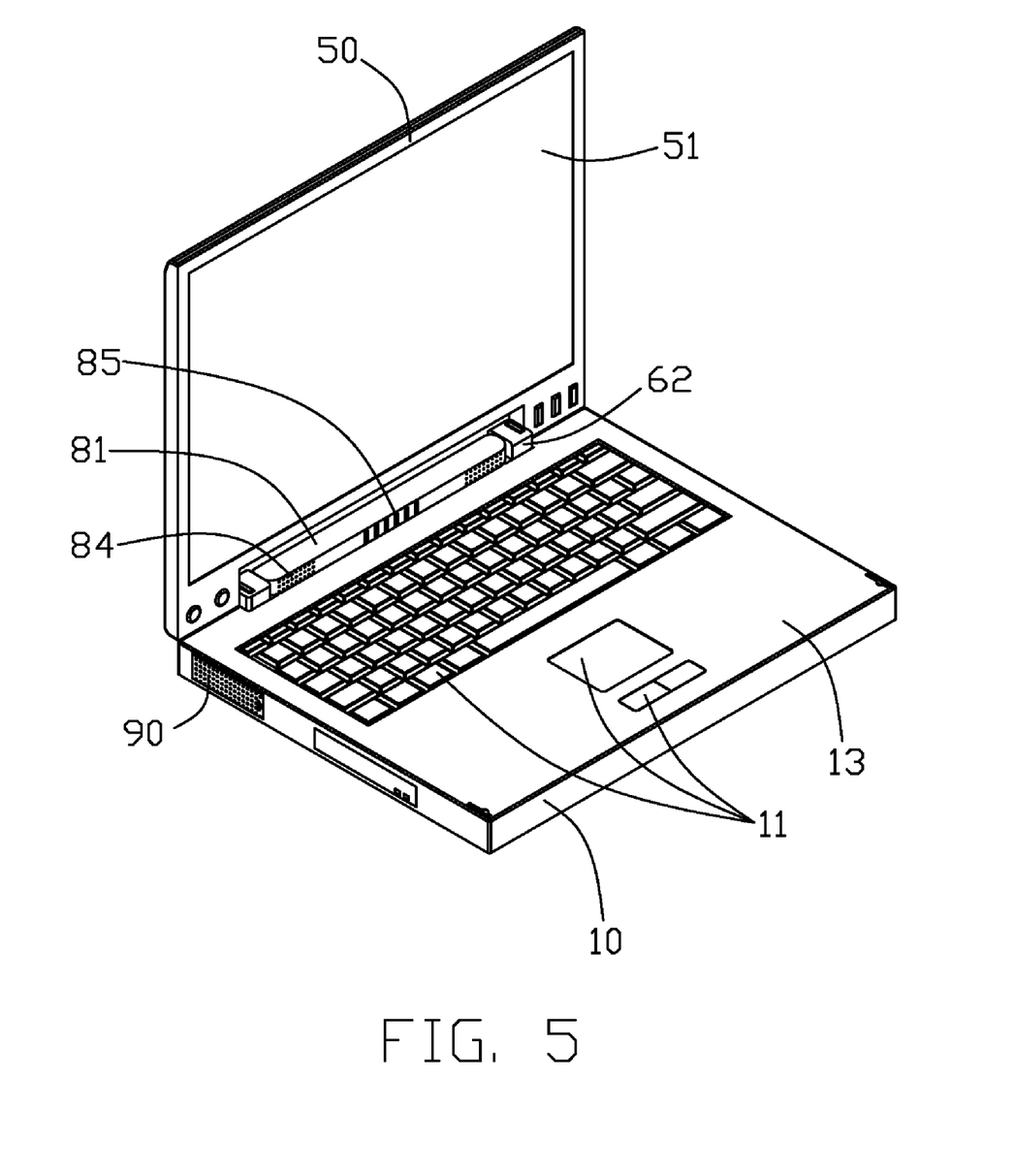
FIG. 5 is an assembled view of FIG. 1, with the display unit in an open position.
Figure 6:
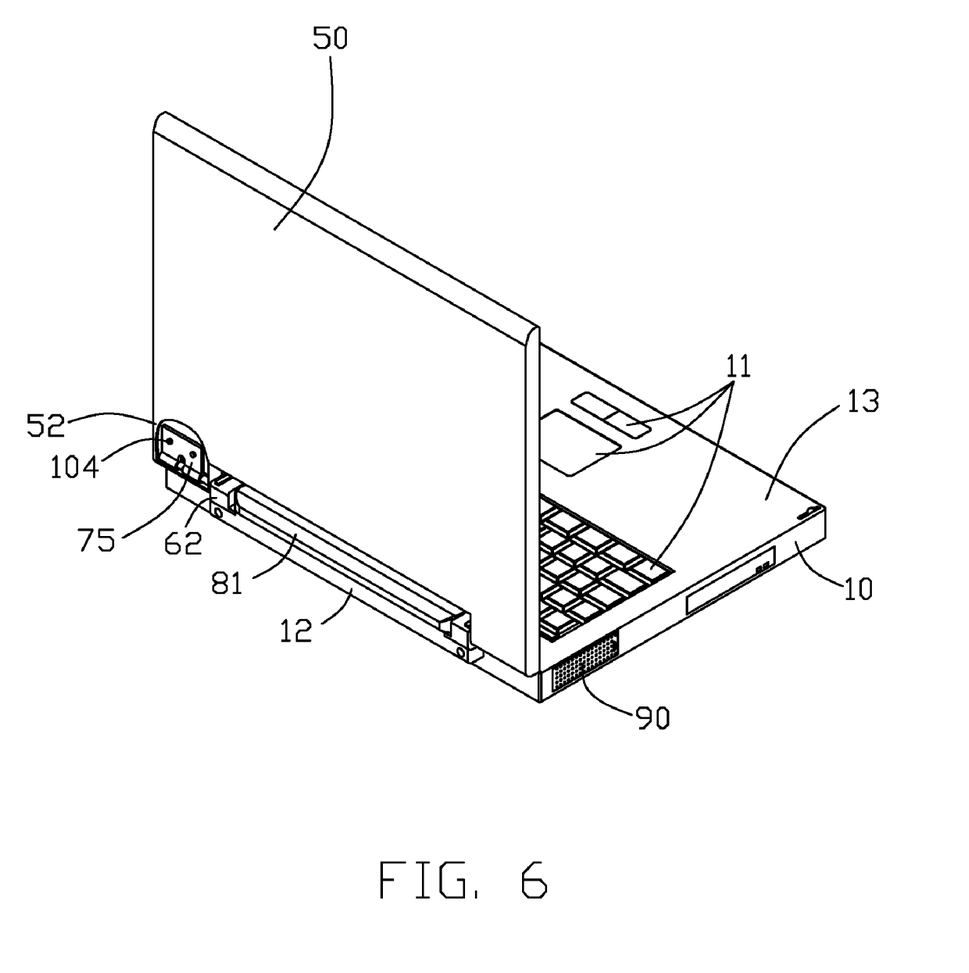
FIG. 6 is an assembled view of FIG. 3, with the display unit in an open position.

Referring also to FIGS. 5 to 6, in assembly, the securing portions 68 of the two fixing members 62 are respectively received into the corresponding two chambers 16 of the extension portion 12 and fixed to the base unit 10 via two fasteners such as screws 102 respectively passing through the two fixing holes 18 of the extension portion 12 and being screwed into the corresponding threaded holes 74 of the two securing portions 68. The engaging portions 66 of the two fixing members 62 are placed in the corresponding depressed portions 14 of the extension portion 12. The two pivoting members 75 are respectively pivotably mounted to the two fixing members 62 via the elongated rods 72 of the two fixing members 62 being inserted into the hollow pivoting portions 79 of the two pivoting members 75. The two pivoting members 75 are then secured to the two support portions 52 of the display unit 50 via a plurality of fasteners 104 being passed through the holding holes 77 of the two pivoting members 75 and screwed into the corresponding threaded holes 59 of the posts 58 of the two support portions 52. Thus, the display unit 50 is pivotably attached to the base unit 10 and can be opened and folded relative to the base unit 10.

The coupling member 86 is set in the hollow holder 20, and the second teeth 88 of the coupling member 86 mesh with the first teeth 25 of the holder 20 thereby the coupling member 86 being rotatably attached in the holder 20, the other end of the coupling member 86 extends out of the top surface 13 through the corresponding passage 22 of the base unit 10. The controller 81 is secured to the top surface 13 of the base unit 10 via the other end of the coupling member 86 being inserted into the coupling opening 82 of the controller 81 and firmly joined together by glue. Signal wires connected with the controller 81 are passed through the channel 89 of the coupling member 82 and the holder 20 and linked to the motherboard of the base unit 10 whereby the controller 81 is electrically connected with the motherboard. In addition, the positioning tab 83 of the controller 81 is put in the positioning groove 24 of the top surface 13 to prevent free movement of the controller 81. The controller 81 and the body portions 64 of the two fixing members 62 are embedded in the holding space 54 of the display unit 50.

The pins 92 of the two first speakers 90 are respectively inserted in the corresponding installing apertures 28 of the base unit 10, the two first speakers 90 are thus pivotably attached to the base unit 10. When the two first speakers 90 are pushed into the two corresponding recesses 26, the locking portions 94 of the two first speakers 90 are locked into the corresponding securing cavities 30 of the two recesses 26, whereby the two first speakers 90 are received and secured within the two recesses 26.

Figure 7:
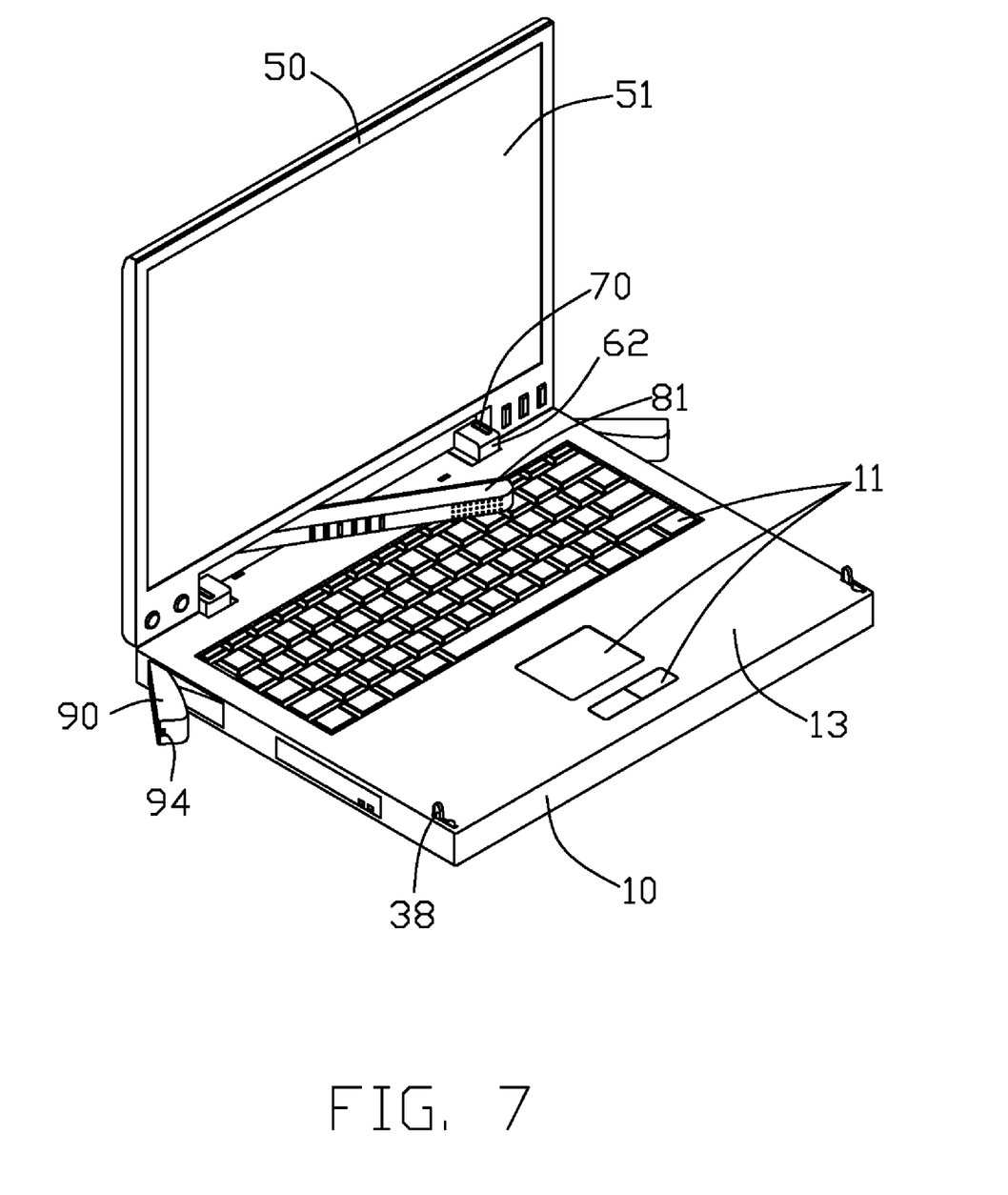
FIG. 7 is similar to FIG. 5, but showing the multi-media controller and the first speakers partially rotate out.
Figure 8:
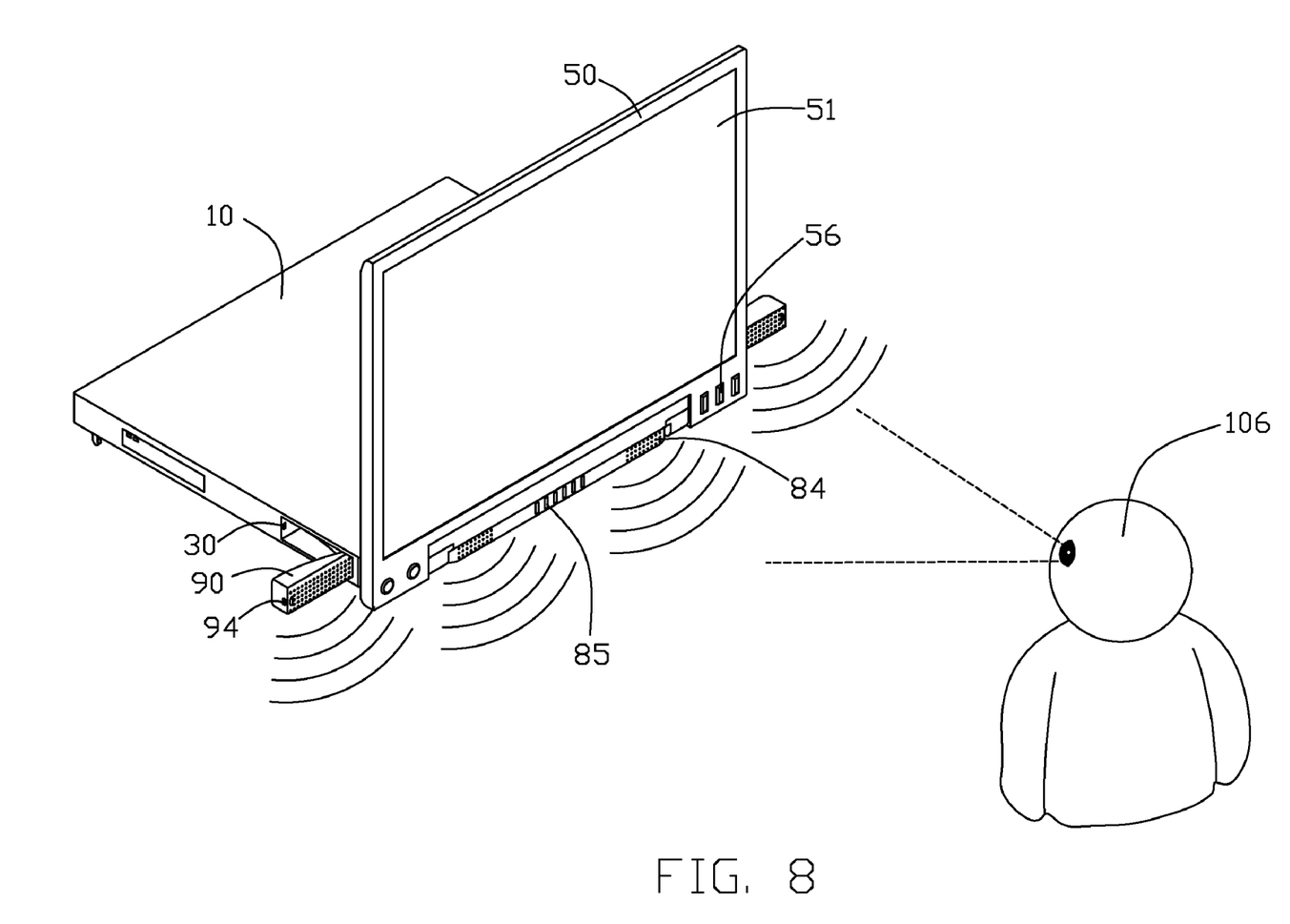
FIG. 8 shows a use state of the portable personal computer, with the display unit pivoted about 270 degrees relative to the base unit and the first speakers extended out of the portable computer to the limit of rotation.

Referring also to FIGS. 7 and 8, when a user 106 operates the portable computer, the display unit 50 is opened at an angle of about 90 degrees relative to the base unit 10. The controller 81 is rotated about 180 degrees, the positioning tab 83 of the controller 81 is unlocked from the positioning groove 24 of the top surface 13 and locked in the positioning groove 23, and the controller 81 is repositioned on the top surface 13. The locking portions 94 of the two first speakers 90 are unlocked from the corresponding securing cavities 30 of the two recesses 26 via manipulating the first speakers 90 at the corresponding operating notches 96, and the two first speakers 90 are rotated 90 degrees out of the corresponding recesses 26. The supporters 38 are taken out of the corresponding retaining slots 32 of the top surface 13 via grasping the supporters 38 at the corresponding orifices 39. The display unit 50 is further rotated about the rods 72 of the two fixing members 62 to be opened at an angle of about 270 degrees relative to the base unit 10, and the extension portion 12 of the base unit 10 is accommodated in the holding space 54 of the display unit 50. When the portable computer is put on a desk or the like with the top surface 13 facing the desk or the like via support of the two supporters 38 and the bolsters 70 of the two fixing members 62, sound output of the first and second speakers 90, 84 is oriented to the same direction and faces toward the user 106, and the user 106 can gain maximum audio clarity and effect. In addition, there is nothing between the display unit 50 and the user 106, the user 106 can intently enjoy videos on the display screen 51 of the display unit 50. Thus, the user 106 can orient the speakers so as to direct sound output of the speakers 90, 84 toward the user 106 to gain maximum audio clarity and effect, and also enjoy video effects as when he/she watches a television at home, or even sees movies at a movie theater.

It is believed that the present embodiment and its advantages will be understood from the foregoing description, and it will be apparent that various changes may be made thereto without departing from the spirit and scope of the invention or sacrificing all of its material advantages, the embodiment and examples hereinbefore described merely being one preferred or exemplary embodiment with exemplary detail.

What is claimed is:

1. A portable electronic device comprising: a base unit comprising an extension portion extending from a rear end thereof; a display unit comprising two support portions extending from a lower portion thereof and defining a holding space between the two support portions configured for receiving the extension portion of the base unit; a hinge mechanism comprising two fixing members attached on the extension portion of the base unit, and two pivoting members respectively secured to the two support portions of the display unit and pivotably mounted to the two fixing members, thereby the display unit bein pivotable relative to the base unit; and a console assembly comprising a controller configured for controlling reproduction of audio or video signals, the controller rotatably mounted to the extension portion and receivable in the holding space of the display unit; wherein the controller is rotatable about an axis perpendicular to the axis about which the display unit is pivotable relative to the base unit.

2. The portable electronic device as claimed in claim 1, wherein each of the fixing members includes a body portion and an elongated rod extending from the body portion, a hollow pivoting portion is formed on each of the pivoting members, and the elongated rods of the two fixing members are pivotably mounted to the corresponding pivoting portions of the two pivoting members.

3. The portable electronic device as claimed in claim 1, wherein two chambers are defined in the extension portion, and each of the fixing members comprises a securing portion secured in a corresponding chamber.

4. The portable electronic device as claimed in claim 3, wherein two fixing holes are defined in a back surface of the extension portion and in communication with the corresponding chambers, two engaging holes are respectively defined in the securing portions of the two fixing members corresponding to the fixing holes, and two fasteners are respectively passed through the two fixing holes and locked in the corresponding engaging holes for securing the two fixing members in the corresponding chambers.

5. The portable electronic device as claimed in claim 1, wherein a plurality of posts each with a connecting hole projects from the two support portions, each of the pivoting members is defined with a plurality of holding holes corresponding to the connecting holes, and a plurality of fasteners is passed through the holding holes and locked in the corresponding connecting holes of the posts for attaching the pivoting members to the support portions of the display unit.

6. The portable electronic device as claimed in claim 1, wherein a recess is defined in a side of the base unit, a speaker is pivotably attached in the recess in the base unit and capable of being rotated out of the recess for producing desirable audio effects.

7. The portable electronic device as claimed in claim 6, wherein two installing apertures are defined in the base unit in communication with the recess, and two pins extend respectively from upper and lower surfaces of the speaker and pivotably mounted in the corresponding installing apertures of the recess for pivotably mounting the speaker to the base unit.

8. The portable electronic device as claimed in claim 6, wherein a securing cavity is defined in the base unit in communication with the recess, and a locking portion projects from the speaker engagable in the securing cavity for securing the speaker in the recess.

9. The portable electronic device as claimed in claim 1, wherein two retaining slots are defined in a top surface of the base unit, two horizontal shafts extend from the top surface of the base unit, and two supporters are respectively mounted to the shafts and are pivotable about the shafts so they can be received in and taken out of the corresponding retaining slots.

10. A portable electronic device comprising:
a base unit comprising an extension portion extending from a rear end thereof;
a display unit comprising two support portions extending from a lower portion thereof and defining a holding space between the two support portions of the display unit configured for receiving the extension portion of the base unit;
a hinge mechanism connecting the base unit and the display unit and allowing the display unit to be pivotable relative to the base unit; and
a console assembly comprising a controller configured for controlling reproduction of audio signals, the controller comprising a speaker and the controller rotatably receivable in the holding space of the display unit and capable of being rotated out of the holding space of the display unit.

11. The portable electronic device as claimed in claim 10, wherein a hollow holder is secured within the base unit adjacent to a middle section of the extension portion, and the console assembly further comprises a coupling member, one end of the coupling member is pivotably mounted in the holder.

12. The portable electronic device as claimed in claim 11, wherein the holder is formed with a plurality of first spaced teeth encircling an inner circumference thereof, the coupling member is formed with a plurality of second spaced teeth encircling an outer circumference of the one end thereof and engaged with the first teeth of the holder.

13. The portable electronic device as claimed in claim 11, wherein a coupling opening is defined in the controller, a passage is defined in a top surface of the base unit corresponding to the holder, the other end of the coupling member extends out of the top surface of the base unit via the passage and is held in the coupling opening.

14. The portable electronic device as claimed in claim 10, wherein two recesses are respectively defined in right and left sides of the base unit, and another two speakers are pivotably mounted in the recesses in the base respectively.

15. The portable electronic device as claimed in claim 10, wherein two retaining slots are defined in a top surface of the base unit, two horizontal shafts are respectively formed in the two retaining slots, and two supporters are mounted to the shafts and are pivotable so they can be received in and taken out of the corresponding retaining slots.

16. The portable electronic device as claimed in claim 10, wherein the hinge mechanism allows the display unit to rotate about 270 degrees relative to the base unit about an axis parallel to the base unit.

17. A portable electronic device comprising: a base unit comprising input devices installed in a surface thereof for input of commands to the electronic device; a display unit pivotably attached to the base unit, the display unit comprising a display screen which covers said surface of the base unit when the display unit is closed to the base unit, the display unit being pivotable relative to the base unit between a first position where the display unit is substantially perpendicular to said surface of the base unit and the display screen is toward said surface and a second position where the display unit is substantially perpendicular to said surface and the display screen is away from said surface; and a console assembly attached to the base unit comprising a controller configured for controlling reproduction of audio signals, the controller comprising a speaker, the controller being rotatable relative to the base unit to cause sound output of the speaker being oriented with the same direction as the display screen at the first and second positions; wherein the display unit is pivotable about an axis parallel to said surface of the base unit and the controller is rotatable about another axis perpendicular to said surface of the base unit.

18. The portable electronic device as claimed in claim 17, wherein a plurality of supporting structures is arranged on opposite sides of said surface of the base unit and configured for supporting the electronic device when the display unit is located at the second position.

19. The portable electronic device as claimed in claim 18, wherein the supporting structures arranged at one of the opposite sides of said surface of the base unit away from the display unit are retractable into the base unit, and the supporting structures arranged at the other one of the opposite sides of said surface of the base unit adjacent the display unit are fixed to the base unit and pivotably attached to the display unit via a rod pivotably received in a hollow pivoting portion.

20. The portable electronic device as claimed in claim 18, further comprising another speaker pivotably mounted in the base unit and being pivotable out of the base unit to cause sound output of said another speaker being oriented with the same direction as the display screen when the display unit is located at the second position.

* * * * *